(12) United States Patent
Rocci et al.

(10) Patent No.: US 10,532,748 B2
(45) Date of Patent: Jan. 14, 2020

(54) METHOD AND APPARATUS FOR ADAPTIVE VEHICULAR CONTROL (71) Applicant: FORD GLOBAL TECHNOLOGIES, LLC, Dearborn, MI (US)

(72) Inventors: Benjamin M. Rocci, Ann Arbor, MI (US); Michael David Beeney, Canton, MI (US); Mark Anthony Rockwell, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 15/729,144

(22) Filed: Oct. 10, 2017

(65) Prior Publication Data

US 2019/0106114 A1 Apr. 11, 2019

(51) Int. Cl.
| | | |
|---|---|---|
| *B60W 50/00* | (2006.01) | |
| *B60W 30/00* | (2006.01) | |
| *G05D 1/00* | (2006.01) | |
| *G08G 1/16* | (2006.01) | |
| *G08G 1/0967* | (2006.01) | |
| *B60W 30/18* | (2012.01) | |
| *G08G 1/01* | (2006.01) | |

(52) U.S. Cl.
CPC ...... *B60W 50/0097* (2013.01); *B60W 30/181* (2013.01); *B60W 30/18072* (2013.01); *B60W 30/18109* (2013.01); *B60W 30/18127* (2013.01); *B60W 30/18154* (2013.01); *G05D 1/0088* (2013.01); *G08G 1/012* (2013.01); *G08G 1/0112* (2013.01); *G08G 1/0116* (2013.01); *G08G 1/09675* (2013.01); *G08G 1/096725* (2013.01); *G08G 1/096741* (2013.01); *G08G 1/096775* (2013.01); *G08G 1/096783* (2013.01); *G08G 1/096791* (2013.01); *G08G 1/165* (2013.01); *G08G 1/166* (2013.01); *B60W 2550/143* (2013.01); *B60W 2550/22* (2013.01); *B60W 2550/402* (2013.01); *G05D 2201/0213* (2013.01)

(58) Field of Classification Search
CPC .... B60W 30/00; B60W 30/09; B60W 30/095; B60W 30/10; B60W 30/14; B60W 30/143; B60W 30/17; B60W 30/18072; B60W 30/18109; B60W 30/18154; B60W 50/00; B60W 50/0097; G05D 1/00; G05D 1/0088; G08G 1/00; G08G 1/16; G08G 1/0116; G08G 1/12; G08G 1/165; G08G 1/166; B60T 8/00
See application file for complete search history.

(56) References Cited

U.S. PATENT DOCUMENTS

| | | | |
|---|---|---|---|
| 9,069,653 B2* | 6/2015 | Be | G06F 17/00 |
| 10,248,129 B2* | 4/2019 | Reed | B60W 40/076 |
| 2009/0234553 A1* | 9/2009 | Sekiguchi | B60W 30/16 |
| | | | 701/96 |

(Continued)

*Primary Examiner* — Yonel Beaulieu
(74) *Attorney, Agent, or Firm* — Frank Lollo; Brooks Kushman P.C.

(57) ABSTRACT

A system includes a processor configured to receive information indicating the presence of an upcoming obstacle along a route and determine a vehicle-control strategy to minimize expected fuel usage between a current location and an obstacle location. The processor may further control the vehicle in accordance with the control strategy or recommend driver actions in accordance with the control strategy.

17 Claims, 4 Drawing Sheets

(56) References Cited

U.S. PATENT DOCUMENTS

| | | | |
|---|---|---|---|
| 2010/0286884 A1* | 11/2010 | Bunn | B60W 30/18072 |
| | | | 701/70 |
| 2011/0068604 A1* | 3/2011 | Neuberger | B62D 35/001 |
| | | | 296/180.2 |
| 2013/0116859 A1* | 5/2013 | Ihlenburg | G06F 17/00 |
| | | | 701/2 |
| 2013/0297124 A1* | 11/2013 | Be | G06F 17/00 |
| | | | 701/22 |
| 2014/0142839 A1* | 5/2014 | Kaminade | G08G 1/166 |
| | | | 701/301 |
| 2015/0100189 A1 | 4/2015 | Tellis et al. | |
| 2016/0252360 A1* | 9/2016 | Annapureddy | G01C 21/3453 |
| | | | 701/428 |
| 2016/0357187 A1 | 12/2016 | Ansari | |
| 2017/0192431 A1* | 7/2017 | Foster | A01B 79/005 |
| 2017/0227639 A1* | 8/2017 | Stokes | G01S 15/89 |
| 2017/0350360 A1* | 12/2017 | Tedesco | B60T 7/18 |
| 2018/0356830 A1* | 12/2018 | Haghighat | B60W 50/14 |

* cited by examiner

METHOD AND APPARATUS FOR ADAPTIVE VEHICULAR CONTROL

TECHNICAL FIELD

The illustrative embodiments generally relate to methods and apparatuses for adaptive vehicular control.

When people drive, they often do not consider the fuel implications of individual actions they are taking. For example, a person in a hurry may speed up until the last possible second to stop at each of a series of lights. If the person is forced to stop at each light, a great deal of fuel was wasted racing between the lights. Further, a faster travel time may have been achievable, had the person been able to simply travel at a slower pace, but time the lights so that no actual stop was needed. Vehicles may use a significant amount of fuel moving from a stopped state up to a travel speed.

It is generally very difficult to know exactly how fast to travel to achieve optimal fuel efficiency in light of potential obstacles. That is, many vehicles will have data indicating that travel at certain speeds uses certain amounts of fuel, but what the data does not indicate is that, under certain conditions, overall fuel economy may be improved by travel at less fuel-efficient speeds, because of a reduction in complete stops, for example. Of course, it may be difficult to plan a route in advance and know when stops will occur. Unless the route is devoid of other vehicles and consists only of stop-signs, significant data may be required to predict when a driver will actually be forced to slow down over an entire route of any substantial length (because, for example, traffic patterns, even if known, will likely change by the time the driver reaches a point ten or fifteen miles into the route).

Traffic light timing may change throughout the course of a day as well. Even if a system knows the timing of traffic lights, intervening vehicle actions (a slow driver in front of an object vehicle, a traffic jam, construction, etc) can impact any prediction about when a vehicle will reach each of a series of lights.

SUMMARY

In a first illustrative embodiment, a system includes a processor configured to receive information indicating an upcoming obstacle along a route and determine a vehicle-control strategy to minimize expected fuel usage between a current location and an obstacle location.

In a second illustrative embodiment, a computer-implemented method includes determining and executing a vehicle control strategy, designed to minimize fuel usage between a current vehicle location and an upcoming obstacle, responsive to receiving data indicating the existence of the obstacle.

In a third illustrative embodiment, a system includes a processor configured to determine both a momentum-preserving strategy and a stopping strategy, responsive data indicating an obstacle along a route, the obstacle having at least a likelihood, determinable based on the data, of clearing prior to a vehicle reaching the obstacle. The processor is further configured to control the vehicle in accordance with one of the determined strategies, based on which strategy is likely to preserve more fuel, determinable based on the likelihood of clearing.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
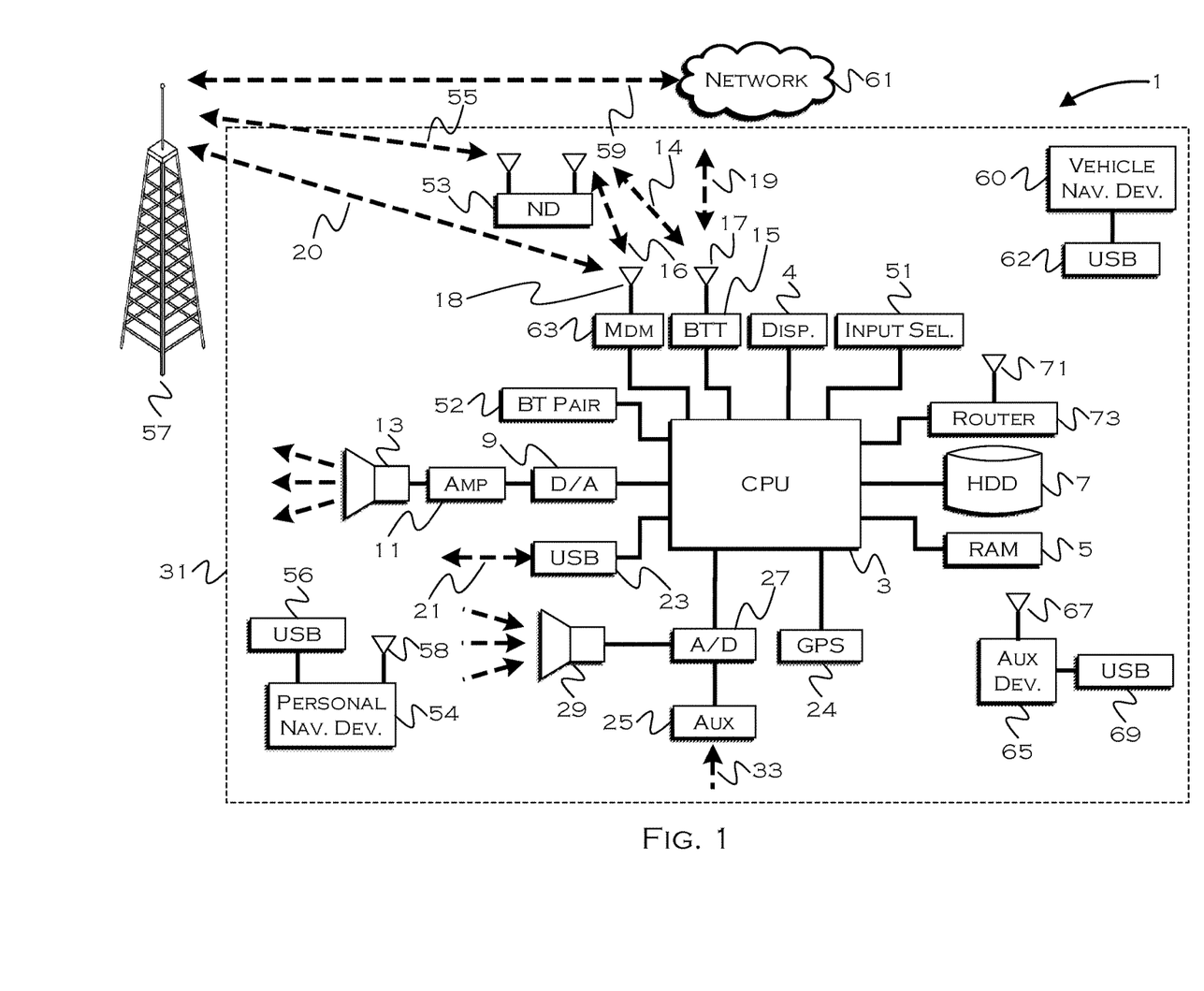
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While it may be difficult to plan a travel strategy for an entire route of any substantial length, due to the varying nature of travel conditions (e.g., patterns change rapidly at times), localized planning may still be reasonably possible using data that is still outside a visible range of a driver. That is, if a driver may begin to slow when the driver sees a red light, the system may be capable of obtaining data, from other vehicles or from local wireless infrastructure, for example, indicating the red light long before the driver can see the light. This may allow for strategic planning of a few mile range, at least, and the planning can be far enough in advance of a vehicle location that it can adapt if a condition changes. While the illustrative embodiments may describe "fuel" preservation, fuel in this context can also refer to preservation of electric power, both gasoline and electric power and any tradeoffs for preserving one resource by transitioning to use of the other. Adaptation to preservation strategies for a fuel resource can be implemented as appropriate for the resource preserved, in accordance with an understanding of what adaptations result in preservation of the resource.

For example, if a vehicle is one mile away from a light that has just turned red for 60 seconds, and the vehicle is traveling at sixty miles per hour, the driver may continue to travel at sixty miles per hour until the driver is within one quarter mile of the light. Such speed and travel means that the driver would actually reach the light right as the light turned green, but the driver may not know this and may begin to slow. Further, traffic already stopped at the light may present another obstacle that will force the driver to stop, even if the light turns green. If the driver had better information about the light, the better strategy to preserve both fuel and momentum may have been to slow down to forty five miles per hour while still one mile out, which would have caused the driver to arrive at the light thirty seconds after the light changed green, giving traffic time to clear. Such a strategy allows the driver to preserve momentum and fuel, and may result in the driver actually passing through the intersection no later than if the driver had sped up to the light and been forced to stop.

On the other hand, if the driver is one mile out and the light turns red for 120 seconds, slowing down to forty five miles per hour may not achieve any particular momentum gains, since the vehicle will still reach the light while the light is red. In a scenario such as this, the better strategy may be to determine (via the vehicle, for example) how much speed can be preserved through coasting and the minimum amount of acceleration. Even if the vehicle has slowed to ten or fifteen miles per hour as it approaches the light, the stop may have been virtually inevitable (without the vehicle traveling at an un-recommended speed, such as below thirty miles per hour for the whole mile) and so coasting up to the stop (essentially losing momentum just before a stop is required) may preserve the maximum amount of fuel, and may reduce the wait time as well. If the driver had driven at sixty miles per hour all the way to the stop, the driver still would have had to wait for one minute, so the extra fuel expended to reach the stop sooner would not have achieved any practical gains.

In still another example, a hybrid or electric vehicle may be able to actually regain power through regenerative braking. Limited power can be recovered by racing up to a stop and stopping, so the vehicle instead may determine an optimal regenerative braking strategy for maximizing power gain prior to a stop that is inevitable in any event. In all of these examples, the ability to obtain localized traffic and light data from other vehicles, the cloud and local infrastructure allows for on-the-spot decisions based on conditions that are unlikely to change significantly (due to locality) prior to a driver reaching a given location. Data can be processed for conditions further away as well, in a similar manner, but often a confidence of prediction (i.e., what speed/braking is needed) will decay with distance as the travel time involved to reach the location increases the odds that a condition will change, especially with regards to traffic conditions.

Certain data (e.g., light timing data) may be more valid for greater distances, and vehicles stopped through a full red light are capable of determining and reporting how long a given light cycle lasts. Of course, if the intersection operates based on pedestrians and traffic (e.g., the cycle timing changes based on cross-traffic and pedestrian requests), even this data may not be particularly useful unless the vehicle is within a few miles of the intersection. On the other hand, a system could use a wider range of data provided by other vehicles and infrastructure, to form a generalized plan, which could be adapted to changing conditions as a vehicle travels. For example, if a person has limited fuel resources and not enough time to refuel, they could request a fuel-optimal route between two points. The system may use the available data from other vehicles and infrastructure to determine that 35 miles per hour is a reasonable speed over most of the route, but individual incidents (stops, traffic, etc) encountered can cause this speed to vary between thirty and forty miles (in this example only) as the vehicle actually travels the route. In this manner, the vehicle can both predict whether the user can likely reach the destination (based on the original route plan which reflected conditions at that time) and adaptive planning to optimize fuel economy as the vehicle travels and reaches any fuel-usage-affecting conditions.

Figure 2:
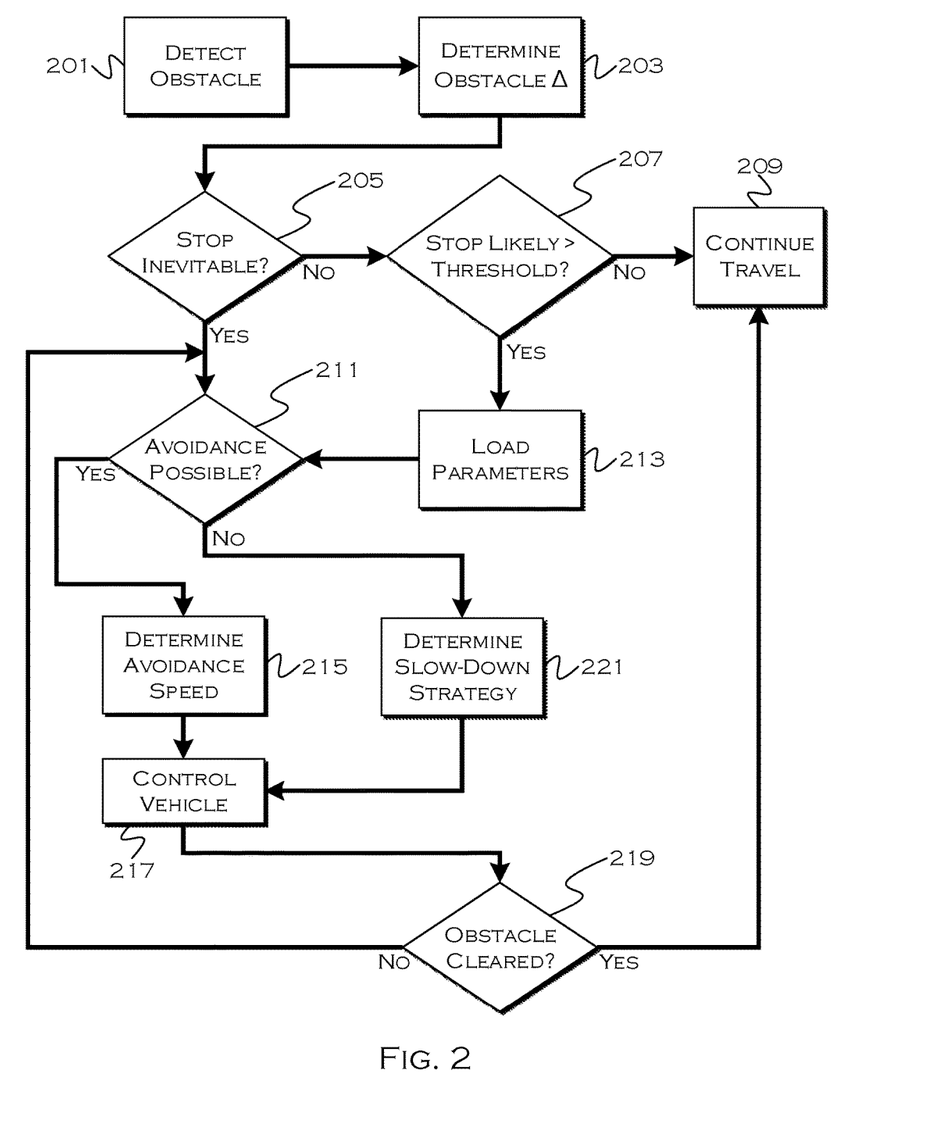
FIG. 2 shows an illustrative process for vehicle control adapting to an obstacle.

FIG. 2 shows an illustrative process for vehicle control adapting to an obstacle. In this illustrative example, local vehicles and/or various infrastructure elements report localized conditions. For example, vehicles can report observed light timing and current light states, and/or lights themselves may broadcast this data to facilitate travel. Vehicles could also broadcast traffic backups, and infrastructure elements (cameras, sensors, etc) could also report stopped, slowing or accumulating traffic. The vehicle system, or a cloud-system supporting the vehicle, or a phone app, etc., uses this data to detect 201 an upcoming obstacle. The obstacle in this example is not an obstacle in the truest sense, but rather a condition that may or will affect a vehicle travel state. Thus, it can include, but is not limited to, lane narrowing, stop sign, stop light, traffic jam, accident, traffic slow-down, etc.

The system also uses the obtained vehicle and infrastructure data to determine 203 an obstacle delta, which is a change rate and/or likelihood of the obstacle moving or clearing by the time the vehicle reaches the obstacle. That is, for a fixed element like a stop light, the process may be able to determine that the obstacle clears every 30 seconds and reappears every 30 seconds. For an element like a traffic jam, the system may determine (based on observed, gathered data from other vehicles) that the traffic has a 20 percent likelihood of clearing, or that the traffic is moving, but at 20 percent of normal speed, or that traffic has not moved, but has rather accumulated, for more than 10 minutes.

Based on information such as the preceding examples and similar information, the process determines 205 if the vehicle will inevitably have to stop at the obstacle. Inevitability may be somewhat relative in this sense, which is to say that an unexpected change in light or traffic patterns may change the result, but in general this is an example where the data indicates that there is a 100 percent or near-100 percent chance of the vehicle having to stop when reaching the point of the obstacle.

If the stop is not "inevitable" (or highly likely above a certainty threshold), the process may determine 207 if the stop is likely above a second tunable threshold. That is, a certain driver may want the system to treat "inevitability" as 90% or greater, and the second threshold as 50% or greater. With regards to predictions themselves, unless they are based on known absolutes (i.e., a light always cycles in 30 seconds, a vehicle is traveling X distance at Y speed with no traffic) the system may use modeling to predict the likelihood of a stop. In such a case, the model will improve over time, and the actual percentage may be, for example, a reflection of how many times a stop has previously occurred under similar conditions.

If the stop is not likely above the second threshold, the process may simply allow 209 the vehicle to continue travel unaffected. If the stop is inevitable, the process may determine 211 if the stop can be avoided. That is, the process may determine if a time or fuel efficient route-around exists, or, for example, if a speed can be achieved that would allow the vehicle to avoid a stop. While the vehicle may not typically want to slow to fifteen miles per hour on a fifty mile per hour road, while still a half mile from a light, for example, if no traffic is present and the conditions allow for the extreme slow down, the process may determine that this is a possibility. Under "normal" conditions (some traffic, certain times of day, etc) this set of conditions may still equate to an "inevitable" stop (because the vehicle would be atypically slow), but at the same time the current actual conditions may allow the "inevitable" stop to actually be avoided by extreme slowing of the vehicle.

If the stop was likely above the second threshold, the process may load 213 a set of driver configurable parameters defining preferences over momentum vs. fuel preservation, maximum slow-downs, etc.

If the process can avoid the stop through a suitable re-route (not shown), the process may re-route the vehicle and repeat these steps for the next obstacle on the new route. If the process can avoid the obstacle through slow-down (and if the slow-down is within driver or legal parameters), the process may determine 215 a current speed or speed strategy that should preserve the maximum amount of vehicle momentum when traveling through the intersection. Or, if not the maximum, at least some vehicle momentum may be preserved. The process then may control 217 the vehicle in accordance with the driving strategy, which can include, for example, direct control, recommendations, changing accelerator response patterns, strategic braking, speed capping, etc.

If avoidance simply is not possible, or is not possible within permissible defined, driver-defined or legal parameters, the process may determine 221 a slow-down strategy designed to preserve the maximum amount of fuel (and/or result in the maximum amount of regeneration) prior to the stop. If the maximum is not achievable or the goal, then at least a strategy of reasonable preservation or regeneration may be employed. The process can also weigh the gains from regeneration against the loss in utilization when considering this strategy (e.g., does the process favor braking over a more controlled coasting).

Once the vehicle clears the obstacle 219, the process can allow 209 normal travel to resume. Until the vehicle clears the obstacle, the process can repeat the strategic evaluations in order to adapt any strategy to an unexpected or unpredictable change in conditions, for example.

Figure 3:
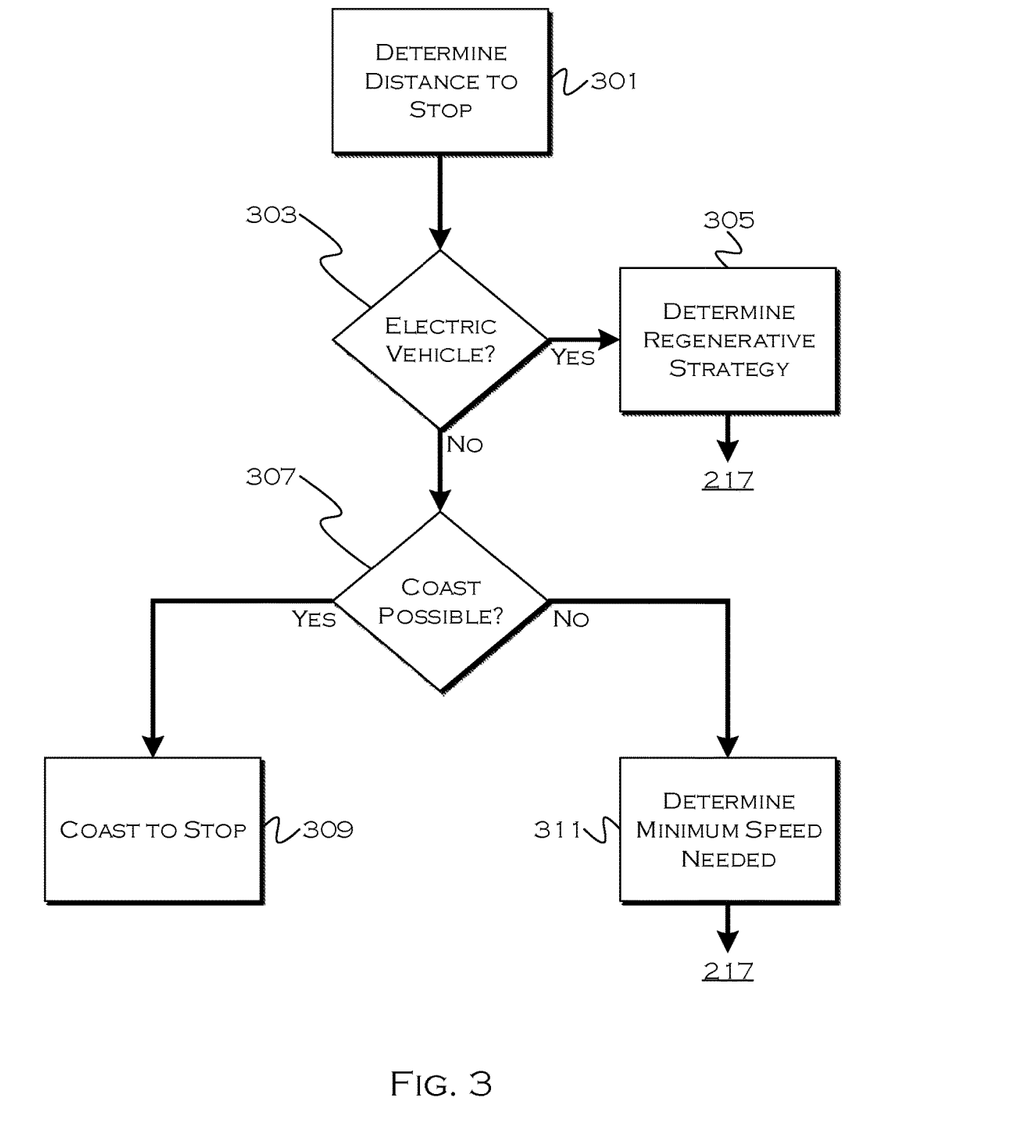
FIG. 3 shows an illustrative fuel-preservation control process.

FIG. 3 shows an illustrative fuel-preservation control process 221. In this example, the process has determined that a stop cannot be avoided, and so the process determines a braking or coasting (or combination strategy) designed to meet predesignated fuel goals (e.g., without limitation, max regeneration, max preservation, balanced regeneration and preservation, etc).

Here, the process determines 301 the likely distance before a stop is needed. The process then determines whether 303 the vehicle is electric (or has an electric power component). If the vehicle includes an electric component rechargeable through regenerative braking, the process determines a slow-down strategy to accommodate regeneration. Since topography and road conditions may also affect this strategy, this data can also be loaded by the process. The process can also consider and user-defined parameters relating to regeneration vs. preservation. If the process can predict the relative gains from regeneration vs. the savings in coasting, the process can determine an optimal strategy, or near optimal strategy, in the absence of any preferences indicating otherwise.

If the vehicle lacks a regeneration component, or if the preferences indicate coasting-preferred strategies, the process may determine 307 if the vehicle can likely coast to a stop. That is, based on the distance remaining, predicted slowdowns due to road conditions or topology, along with known vehicle engine-braking or general slow down characteristics, the process can determine whether the current speed and distance remaining would permit the vehicle to completely cease acceleration before reaching the light (essentially rolling to a stop at the light, or near the light). The "minimum" for coasting may not be 0, necessarily (i.e., the process does not have to determine that the vehicle can literally stop at the requisite point), but instead could be a low threshold (e.g., below five or ten miles per hour).

If coasting is possible, the process instructs 309 the vehicle to cease acceleration and begin coasting to the stop. In other examples, the process could limit acceleration, recommend coasting to a driver, recommend not braking unless needed for safety, etc. If coasting is not possible, that is, if the vehicle will require at least some amount of continued acceleration or fueled-velocity prior to the light, the process calculates 311 a slow-down strategy to achieve the minimum (or optimal) speed for an eventual coast to the light. In other strategies, depending on the fuel characteristics of a vehicle, the process will determine speed strategies that optimize or near-optimize fuel preservation in line with the known usage characteristics. Again, the process can either actually execute the strategy or portions of the strategy, can control parameters (acceleration, braking, etc) in line with the strategy or can simply recommend certain actions to a driver. Driver preferences may also be used to indicate whether vehicle-control or driver-control or a combination is desired.

Figure 4:
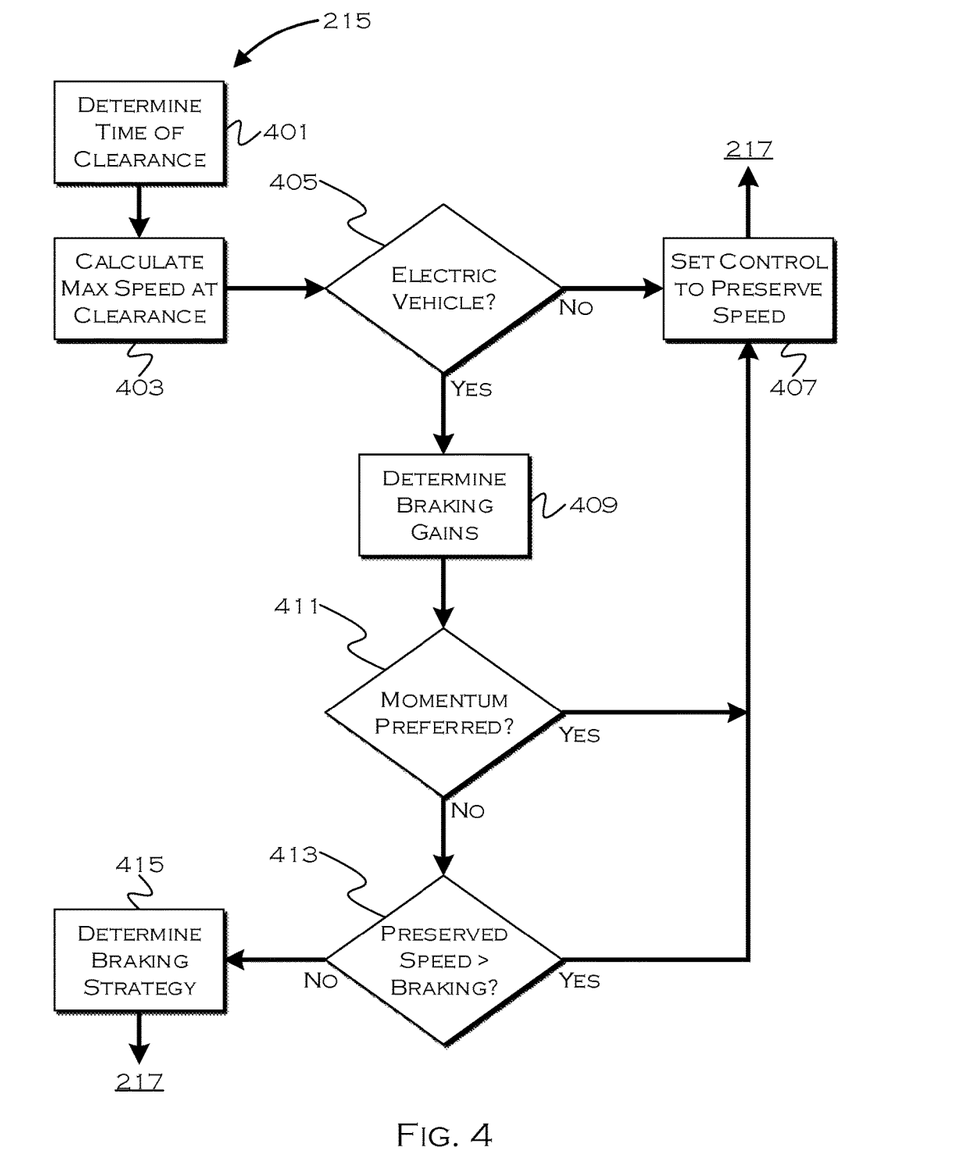
FIG. 4 shows an illustrative momentum preservation control process.

FIG. 4 shows an illustrative momentum preservation control process 215. In this example, the process attempts to control vehicle speed to preserve suitable or maximum momentum through an obstacle location (which obviously assumes the obstacle is no longer there when the vehicle reaches the location). While momentum preservation may also be a good way to preserve fuel, the process may still opt-out of momentum preservation for many circumstances when the likelihood of the obstacle still being at the location is too high. That is, acting to preserve momentum may use more fuel than coasting to a stop, so if the likelihood of an obstacle is high, more fuel will be wasted by acting to preserve momentum and then having to stop anyhow.

In one example, the system can even use the likelihood of the obstacle clearing for the total calculation. For example, if a coasting strategy uses 2 units of fuel, and there is a 45% chance of stopping, and 2 units of fuel are required to achieve a momentum preserved speed (e.g., 25 mph), then the expected fuel usage for coasting is 4 (because whether or not the stop is actually required, the vehicle will essentially have coasted to a stop anyhow). At the same time, momentum preservation may require 3 units of fuel, which makes the momentum calculation 3*0.55+(3+2)*0.45. This reflects the likelihood of not-stopping (0.55) and the only fuel required in that case is the 3 units to maintain the 25 mph speed, as well as the likelihood of stopping, which still uses the 3 units plus 2 more to re-achieve the 25 mph speed after stopping. So, under this scenario, coasting uses 4 units and momentum preservation uses 3.9 units. This is an oversimplification (e.g., the coasting could be aborted early if the light changed early or traffic cleared, for example), but it generally shows how the process can weight a decision between the two strategies.

Driver preferences may also dictate which strategy is employed. If the likelihood of stopping is80% in the above scenario, the values change to coasting=4 and momentum preservation=4.6. But, a driver may only want to "risk it" in the interest of not slowing or stopping (a preference of many drivers). So the driver may configure the system to only coast if the stopping is above a threshold likelihood, or if the difference in fuel preservation is above a threshold, or, for example, if fuel is drive-critical (i.e., the driver is near-empty and needs maximum fuel efficiency to reach a route-end).

In the example shown, the process has determined that the value of coasting is better for fuel economy or driver preference, and the process determines 401 a time when the obstacle is expected to clear. This assumes that the system has at least some information indicating obstacle-clearance. The process uses the time when the obstacle is expected to clear to determine 403 a possible maximum (legal) speed at the time of clearance. This can also accommodate local traffic conditions (i.e., the vehicle may not be able to expect to maintain a 60 mph speed for one mile if the light clear in 58 seconds if there are also eleven vehicles stopped at the light), so in the instances where other vehicles or infrastructure reports intervening obstacles the system can effectively treat the nearest vehicle as an obstacle. Or the system can treat the whole set (stopped cars and light) as one obstacle with a more complicated movement pattern. Assumptions about average vehicle acceleration after a light change can be used to predict traffic clear-up following a change, and thus the vehicle can still calculate a maximum achievable speed for either the intersection (or location) associated with the "main" obstacle or for the nearest portion (usually the trailing stopped vehicle).

In this example, for the sake of explanation of process, the system determines 405 if the vehicle is an electric vehicle (or if the vehicle benefits from regenerative braking). If the vehicle does not have a regenerative component, the process sets 407 a control strategy (or recommends, or controls acceleration/braking, etc) to achieve the desired predicted momentum in a fuel efficient manner.

If the vehicle includes a regenerative system, the process determines 409 fuel gains from braking (which could adjust the previously demonstrated comparative calculation). The process also checks 411 (which could have been done previously) whether or not the driver prefers momentum over fuel. If the goal if absolute fuel preservation/net fuel, the process determines 413 whether momentum preservation is better for net fuel than regenerative braking. For example, using the previous numbers with an 80 percent chance of a stop, a regenerative system may add 1 unit of fuel in the coasting strategy making the coasting=3 total units (4 minus the 1 unit regained from regeneration) and the cost of momentum likely 4.4 total units (4.6 minus some nominal gain from regeneration). This might shift the math towards coasting in this scenario. Again, the math is somewhat imprecise for example purposes, but generally the momentum preservation strategy will not benefit significantly from braking even if the stop is forced, because the vehicle will be attempting to preserve momentum right up until it cannot (is forced to stop).

If braking is now the better or preferred strategy (or braking/coasting), the process may determine 415 the optimal braking/coasting strategy and cause the vehicle to be controlled (or recommend control, control functions, etc) in accordance with this strategy.

Generally, by being able to know characteristics of localized stopping and slowing conditions from vehicle to vehicle communication and infrastructure, a vehicle can control, or at least recommend, improved slowing or speed strategies that help preserve fuel and improve the driving experience. Since drivers have somewhat imperfect information limited by the driver's own perceptions, this system allows the vehicle to "perceive" a greater amount of information on behalf of the driver and help improve the driver's driving decisions, whether those decisions attempt to focus on preserving speed/time or preserving fuel.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
  a processor configured to:
  wirelessly receive information indicating presence of an upcoming traffic control signal, signaling a vehicle stop, along a route;
  determine a vehicle-control strategy to minimize expected fuel usage between a current location and traffic control signal location, where the vehicle is expected to stop based on the traffic control signal.

2. The system of claim 1, wherein the processor is further configured to determine the strategy based on a likelihood, determined from the received information, of the traffic control signal still indicating a vehicle stop when a vehicle reaches the traffic control signal location.

3. The system of claim 1, wherein the strategy includes strategic braking.

4. The system of claim 1, wherein the strategy includes strategic acceleration.

5. The system of claim 1, wherein the strategy includes strategic coasting.

6. The system of claim 1, wherein the processor is further configured to execute the vehicle-control strategy to control the vehicle until either the vehicle reaches the traffic control signal location or the obstacle is no longer present.

7. The system of claim 6, wherein the processor is configured to control the vehicle directly in place of a driver.

8. The system of claim 6, wherein the processor is configured to control the vehicle by limiting braking or acceleration.

9. The system of claim 1, wherein the processor is further configured to use the vehicle-control strategy to recommend control actions to a driver until either the vehicle reaches the traffic control signal location or the traffic control signal no longer signals a vehicle stop.

10. The system of claim 1, wherein the strategy includes momentum preservation.

11. The system of claim 1, wherein the traffic control signal includes a stop light indicating a stop.

12. A computer-implemented method comprising:
determining and executing a vehicle control strategy, designed to minimize fuel usage between a current vehicle location and an upcoming traffic location requiring vehicle slow-down at the traffic location, responsive to wirelessly receiving data indicating presence of the traffic location requiring vehicle slow-down.

13. The method of claim 12, wherein the data also indicates observed changes to traffic usable to determine a likelihood the traffic will still require vehicle slow-down at the traffic location the vehicle reaches the upcoming traffic location, and wherein the control strategy is based at least in part on a likelihood the traffic will still require vehicle slow-down at the traffic location.

14. The method of claim 12, wherein the data is received from another vehicle that already encountered the traffic at the traffic location.

15. The method of claim 12, wherein the data is received from an infrastructure element observing the traffic at the traffic location.

16. The method of claim 12, wherein the data is received from an infrastructure element causing the traffic and deployed in proximity to the traffic location.

17. A system comprising:

a processor configured to:

determine both a momentum-preserving strategy and a stopping strategy, responsive to wirelessly receiving data indicating presence of either a traffic signal signaling a stop or traffic requiring a vehicle slowdown at a traffic location, along a route;

determine a likelihood of the signal no longer signaling a stop or the traffic no longer requiring a slow-down at the traffic location, depending on which of the traffic signal or traffic was indicated by the data, the determination based on the received data indicating patterns, observed by an entity transmitting the data, associated with the signal or traffic, wherein the patterns indicate observed changes in the respective signal or traffic over time; and control the vehicle in accordance with one of the determined strategies, based on which strategy is likely to preserve more fuel, determinable based on a likelihood of the signal no longer signaling a stop or the traffic no longer requiring a slow-down at the traffic location, depending on which of the signal or traffic was indicated by the received data.

* * * * *